(12) United States Patent
Furukawa (10) Patent No.: US 9,041,593 B2
(45) Date of Patent: May 26, 2015

(54) TARGET TRACKING APPARATUS, STORAGE MEDIUM STORED A TARGET TRACKING PROGRAM, TARGET TRACKING SYSTEM, AND TARGET TRACKING METHOD

(75) Inventor: Hidetoshi Furukawa, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 385 days.

(21) Appl. No.: 13/613,787

(22) Filed: Sep. 13, 2012

(65) Prior Publication Data
US 2014/0028489 A1 Jan. 30, 2014

(30) Foreign Application Priority Data

Mar. 2, 2012 (JP) .................................. 2012-047194

(51) Int. Cl.
| | | |
|---|---|---|
| G01S 13/44 | (2006.01) |
| G01S 3/786 | (2006.01) |
| G01S 5/04 | (2006.01) |
| G01S 5/02 | (2010.01) |
| G01S 13/68 | (2006.01) |
| G01S 13/72 | (2006.01) |
| G01S 13/66 | (2006.01) |

(52) U.S. Cl.
CPC . *G01S 13/44* (2013.01); *G01S 5/04* (2013.01); *G01S 5/0294* (2013.01); *G01S 13/685* (2013.01); *G01S 13/726* (2013.01); *G01S 13/66* (2013.01); *G01S 3/7864* (2013.01); *G01S 13/68* (2013.01); *G01S 13/72* (2013.01)

(58) Field of Classification Search
CPC .................... G01S 5/0294; G01S 5/04; G01S 13/66–13/726
USPC ....................................... 342/89–97, 175, 189
See application file for complete search history.

(56) References Cited

U.S. PATENT DOCUMENTS

| | | | | | |
|---|---|---|---|---|---|
| 4,633,261 | A | * | 12/1986 | Kosaka et al. | 342/430 |
| 4,914,604 | A | * | 4/1990 | Castelaz | 235/414 |
| 5,107,271 | A | * | 4/1992 | White | 342/195 |
| 5,128,684 | A | * | 7/1992 | Brown | 342/189 |
| 5,386,370 | A | * | 1/1995 | Woo | 701/408 |
| 5,604,683 | A | * | 2/1997 | Roecker | 342/378 |

(Continued)

FOREIGN PATENT DOCUMENTS

JP 10-142325 5/1998

OTHER PUBLICATIONS

U.S. Appl. No. 13/488,788, filed Jun. 5, 2012, Hidetoshi Furukawa.

(Continued)

*Primary Examiner* — Peter Bythrow
(74) *Attorney, Agent, or Firm* — Oblon, McClelland, Maier & Neustadt, L.L.P.

(57) ABSTRACT

According to one embodiment, a target tracking apparatus acquires a first determination result by determining which combination of N-dimensional tracks is for the real target, acquires a second determination result by determining which combination of N-dimensional angular observation values is for the real target, selects the first determination result when an observation environment is an environment other than a dense environment, selects the second determination result when the observation environment is a dense environment, and calculates distance information to thereby generate an (N+1)-dimensional track for each target.

13 Claims, 8 Drawing Sheets

(56) References Cited

U.S. PATENT DOCUMENTS

| | | | |
|---|---|---|---|
| 5,798,942 A * | 8/1998 | Danchick et al. | 342/96 |
| 5,959,574 A * | 9/1999 | Poore, Jr. | 342/96 |
| 6,522,288 B1 * | 2/2003 | Paradie et al. | 342/145 |
| 6,704,692 B1 * | 3/2004 | Banerjee et al. | 702/189 |
| 6,901,030 B1 * | 5/2005 | Owen et al. | 367/124 |
| 7,236,121 B2 * | 6/2007 | Caber | 342/62 |
| 7,924,213 B2 * | 4/2011 | De Waard et al. | 342/59 |
| 8,681,041 B2 * | 3/2014 | Rojas et al. | 342/95 |
| 2006/0238407 A1 * | 10/2006 | Bourdelais et al. | 342/90 |
| 2006/0279453 A1 * | 12/2006 | Caber | 342/97 |
| 2010/0109938 A1 * | 5/2010 | Oswald et al. | 342/90 |

OTHER PUBLICATIONS

Masayoshi Ito, et al., "Target Correlation Algorithm between 2-Dimensional Angle Sensors", Treatise Collection B2 by the Institute of Electronics, Information and Communication Engineers (IEICE), vol. J81-B2, No. 2, Feb. 1998, 7 pages.

Krishna R. Pattipati, et al., "Passive Multisensor Data Association Using a New Relaxation Algorithm", Multitarget-Multisensor Tracking: Advanced Applications, Chapter 7, 1990, 9 pages.

Masayoshi Ito, et al., "Tracking a 3-Dimensional Moving Target with Distributed Passive sensors using Extended Kalman Filter", treatise Collection B by the Institute of Electronics, Information and Communication Engineers (IEICE), vol. J82-B, No. 5, May 1999, 10 pages.

S.S. Blackman, "Association and Fusion of Multiple Sensor Data", Multitarget-Multisensor Tracking: Advanced Application, Chapter 6, 1990, 8 pages.

* cited by examiner

TARGET TRACKING APPARATUS, STORAGE MEDIUM STORED A TARGET TRACKING PROGRAM, TARGET TRACKING SYSTEM, AND TARGET TRACKING METHOD

CROSS-REFERENCE TO RELATED APPLICATIONS

This application is based upon and claims the benefit of priority from Japanese Patent Application No. 2012-047194, filed Mar. 2, 2012, the entire contents of which are incorporated herein by reference.

FIELD

Embodiments described herein relate generally to a target tracking apparatus, a storage medium stored a target tracking program, target tracking system, and target tracking method each configured to integrate information items of a plurality of N-dimensional angular sensors each used for observing an angle of a target, calculate distance information, generate an (N+1)-dimensional track of an added target, and maintain the track.

BACKGROUND

In a target tracking system, when information items of two two-dimensional angular sensors are integrated to thereby carry out tracking of two targets, processing of determining (or discriminating) which combination of two-dimensional tracks is for real target (not ghost) from four combinations of two-dimensional tracks output from two angular tracking devices provided in one-to-one correspondence with the two-dimensional angular sensors is proposed. Furthermore, when tracking of m targets is carried out, processing of determining which combination of two-dimensional tracks is for real target from $m^2$ combinations of two-dimensional tracks output from two angular tracking devices is now also investigated.

However, in the conventional target tracking system described above, with an increase in the number m of targets in a predetermined space to be input to the angular tracking device, two-dimensional tracks based on incorrect data association become liable to occur. Accordingly, there is a problem that the performance for determining which combination of two-dimensional tracks is for real target from combinations of two-dimensional tracks output from the angular tracking device is deteriorated.

DETAILED DESCRIPTION

In general, according to one embodiment, there is provided a target tracking apparatus configured to track each target on the basis of an N-dimensional (N is 1 or 2) angular observation value for each target detected by each of n (n is an integer equal to or greater than 2) N-dimensional angular sensors, and an N-dimensional track for each target obtained by subjecting each of the N-dimensional angular observation values to angular tracking comprising:

a first determination device configured to determine which combination of N-dimensional tracks is for the real target from combinations of N-dimensional tracks for the target;

a second determination device configured to determine which combination of N-dimensional angular observation values is for the real target from combinations of N-dimensional angular observation values for the target;

a determination selection device configured to analyze an observation environment for the target, select the determination of the first determination device when the observation environment is an environment other than a dense environment, and select the determination of the second determination device when the observation environment is a dense environment; and a track generation device configured to calculate distance information on the basis of a combination of N-dimensional tracks for which it is determined by the first determination device that the tracks are for the real target or on the basis of a combination of N-dimensional angular observation values for which it is determined by the second determination device that the angular observation values are for the real target, and add the calculated distance information to the N-dimensional track or the N-dimensional angular observation value for each target to thereby generate an (N+1)-dimensional track for each target.

Hereinafter, a target tracking system according to an embodiment will be described below with reference to the drawings.

First Embodiment

Figure 1:
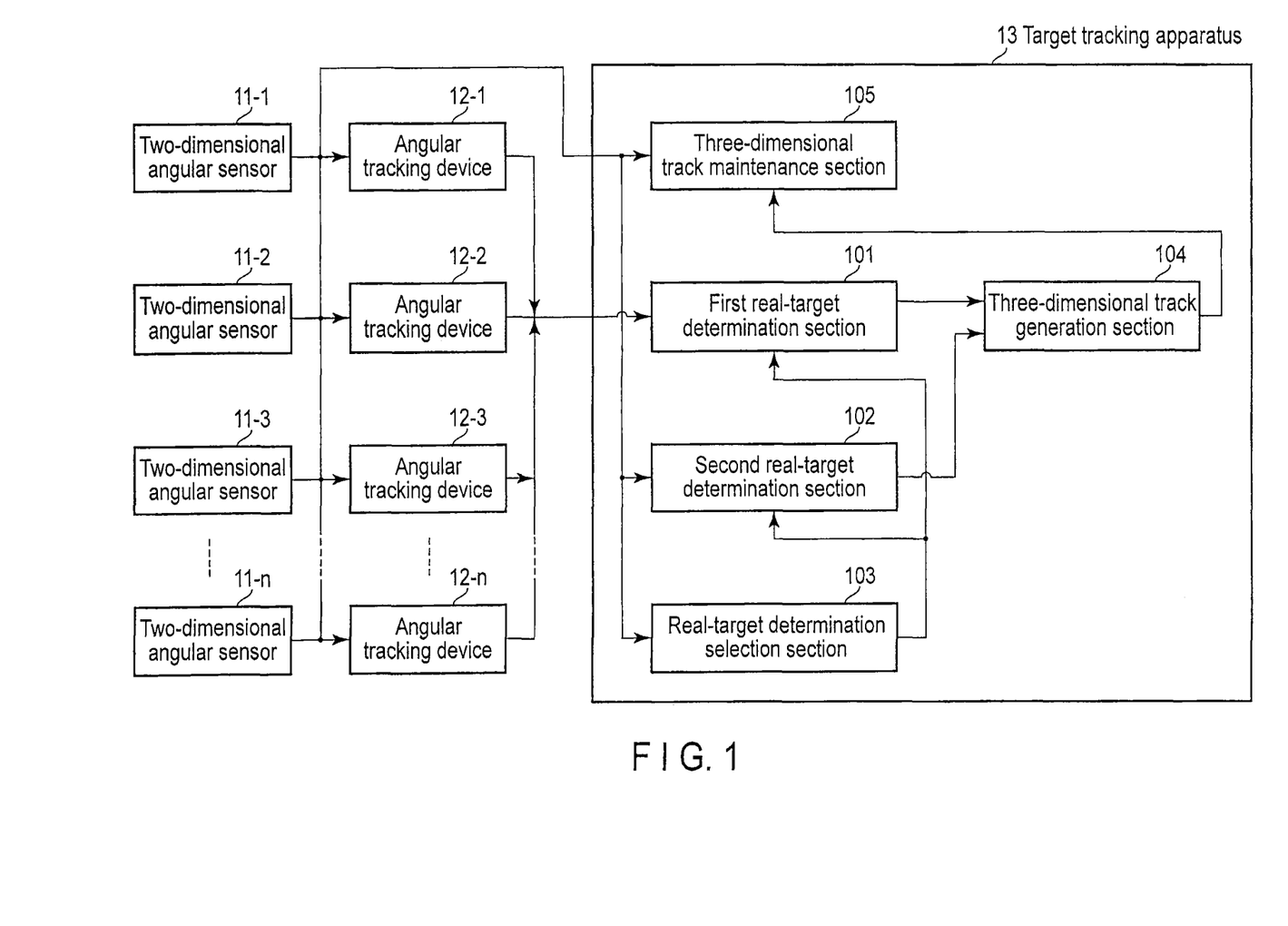
FIG. 1 is a block diagram showing the configuration of a target tracking system according to a first embodiment.

FIG. 1 is a block diagram showing the configuration of a target tracking system according to a first embodiment. This target tracking system is provided with n (n is an integer of 2 or greater) two-dimensional angular sensors 11-1 to 11-$n$ each of which is configured to observe a two-dimensional angle of a target. A two-dimensional angular observation value of each target obtained by each of the two-dimensional angular sensors 11-1 to 11-$n$ is sent to corresponding one of n angular tracking devices 12-1 to 12-$n$. Each of the angular tracking devices 12-1 to 12-$n$ calculates a two-dimensional track for each target from an input two-dimensional angular observation value of each target, thereby carrying out two-dimensional angular tracking of each target. The two-dimensional track for each target obtained in this way is sent to a target tracking apparatus 13 together with the two-dimensional angular observation value of each target obtained by each of the two-dimensional angular sensors 11-1 to 11-$n$.

This target tracking apparatus 13 is configured to track each target by generating a three-dimensional track for each target from the two-dimensional angular observation value of each target obtained by each of the two-dimensional angular sensors 11-1 to 11-$n$, and two-dimensional track for each target obtained by each of the angular tracking devices 12-1 to 12-n, and by maintaining the generated three-dimensional track for each target.

More specifically, the target tracking apparatus 13 is constituted of a first real-target determination section 101, second real-target determination section 102, real-target determination selection section 103, three-dimensional track generation section 104, and three-dimensional track maintenance section 105.

The above-mentioned first real-target determination section 101 inputs the two-dimensional track for each target from each of the angular tracking devices 12-1 to 12-n, and determines which combination of two-dimensional tracks is for the real target from combinations of two-dimensional tracks for the targets calculated from two-dimensional angular observation values of a plurality of two-dimensional angular sensors. Here, specific examples 1 to 3 of the determination system in the first real-target determination section 101 will be described below.

In the determination system of the specific example 1, one reference vector is calculated based on positions of each two two-dimensional angular sensors, a two-dimensional track is obtained on the basis of two-dimensional angular observation values observed by the two-dimensional angular sensors, and a vector in the target direction is calculated based on two-dimensional track when a target was considered by each two-dimensional angular sensors. Further, when the three vectors including the one reference vector and two target direction vectors exist in the common plane within a predetermined error range, it is determined that they are the real target.

According to the configuration of the specific example 1 in the first real-target determination section 101, it is possible to carry out processing identical to a target tracking apparatus described in Document 1 (Masayoshi Ito, Shingo Tsujimichi, Yoshio Kosuge, "Target Correlation Algorithm between 2-Dimensional Angle Sensors", Transactions B2, Institute of Electronics, Information and Communication Engineers, vol. J81-B2, pp. 162-168, February 1998).

In the determination system of the specific example 2, same as operative example 1, one reference vector is calculated based on positions of each two two-dimensional angular sensors, a two-dimensional track is obtained on the basis of two-dimensional angular observation values observed by the two-dimensional angular sensors, and a vector in each target direction of the target which is detected by each two-dimensional angular sensors is calculated based on two-dimensional track. Further, when the three vectors including the one reference vector and two target direction vectors exist in the common plane within a predetermined error range, and velocity vectors in the three-dimensional space calculated on the basis of angular velocities included in the two-dimensional track become identical to each other within a predetermined error range, it is determined that they are the real target.

According to the configuration of the specific example 2 in the first real-target determination section 101, it is possible to carry out processing identical to the target tracking apparatus described in Jpn. Pat. Appln. KOKAI Publication No. 10-142325 or Document 1.

In the determination system of the specific example 3, a combination of two two-dimensional angular sensors is selected from at least three two-dimensional angular sensors, one reference vector is calculated based on positions of the selected two two-dimensional angular sensors, a two-dimensional track is obtained on the basis of two-dimensional angular observation values observed by the two-dimensional angular sensors, and a vector in each target direction of the target which is detected by each two-dimensional angular sensors is calculated based on two-dimensional track. Further, when the three vectors including the one reference vector, and the two target direction vectors exist in the common plane within a predetermined error range, it is determined that they are candidates for the real target, and when the number of combinations of two-dimensional angular sensors for which it is determined that they are candidates for the real target exceeds a predetermined value, it is determined that they are the real target.

As the processing of the specific example 3 in the first real-target determination section 101, a case where two-dimensional angular observation values of two targets are obtained by three two-dimensional angular sensors 11-1 to 11-3 will be described below as an example.

It is assumed that a two-dimensional track corresponding to a two-dimensional angular observation value of a jth target of the two-dimensional angular sensor 11-i is Tij. At this time, when eight combinations $(T_{11}, T_{21}, T_{31})$, $(T_{11}, T_{21}, T_{32})$, $(T_{11}, T_{22}, T_{31})$, ..., $(T_{12}, T_{22}, T_{32})$ of two-dimensional angular sensors and two-dimensional tracks exist. Combinations of two two-dimensional angular sensors are selected from the combination $(T_{11}, T_{21}, T_{31})$ of the two-dimensional angular sensors and two-dimensional tracks, three combinations $(T_{11}, T_{21})$, $(T_{11}, T_{31})$, and $(T_{21}, T_{31})$ of the two-dimensional angular sensors and two-dimensional tracks are obtained. Each of the combinations is subjected to processing identical to the specific example 1 in the first real-target determination section 101, it is determined whether or not each of them is a candidate for the real target, and when the number of combinations for which it is determined that they are candidates for the real target exceeds a predetermined value for determination of the real target, it is determined that they are the real target.

The above-mentioned second real-target determination section 102 inputs the two-dimensional angular observation value for each target from each of the two-dimensional angular sensors 11-1 to 11-n, and determines which combination of two-dimensional angular observation values is for the real target from combinations of two-dimensional angular observation values obtained from the plurality of two-dimensional angular sensors. Here, specific examples 1 to 3 of the determination system in the second real-target determination section 102 will be described below.

As the determination system of the specific example 1, there is a determination system which calculates one reference vector based on positions of two two-dimensional angular sensors, and two target direction vectors based on two-dimensional angular observation values obtained from the two-dimensional angular sensors. Further, there is the system in which when the three vectors including the one reference vector and the two target direction vectors exist in the common plane within a predetermined error range, it is determined that they correspond to the real target. According to the configuration of the specific example 1 in the second real-target determination section 102, it is possible to carry out processing identical to the target tracking apparatus described in Document 1 except that the two-dimensional angular observation value is used in place of the two-dimensional track.

As the determination system of the specific example 2, there is a determination system which calculates one reference vector based on positions of the two selected two-dimensional angular sensors, and two target direction vectors based on two-dimensional angular observation values obtained from the two-dimensional angular sensors. Further, there is the system in which when the three vectors including the one reference vector and two target direction vectors exist in the common plane within a predetermined error range, it is determined that they are candidates for the real target, and when the number of combinations of two-dimensional angular sensors for which it is determined that they are candidates for the real target exceeds a predetermined value, it is determined that they correspond to the real target.

As the processing of the specific example 2 in the second real-target determination section 102, a case where two-dimensional angular observation values of two targets are obtained by three two-dimensional angular sensors 11-1 to 11-3 will be described below as an example.

It is assumed that a two-dimensional angular observation value of a jth target of the two-dimensional angular sensor 11-$i$ is $M_{ij}$. It should be noted that, for convenience of explanation, j of $M_{ij}$ is assumed to indicate that each of the two-dimensional angular sensors shows the same target. At this time, when eight combinations $(M_{11}, M_{21}, M_{31})$, $(M_{11}, M_{21}, M_{32})$, $(M_{11}, M_{22}, M_{31})$, ..., $(M_{12}, M_{22}, M_{32})$ of two-dimensional angular sensors and two-dimensional angular observation value exist, and combinations of two two-dimensional angular sensors are selected from the combination $(M_{11}, M_{21}, M_{31})$ of the two-dimensional angular sensors and two-dimensional angular observation value, three combinations $(M_{11}, M_{21})$, $(M_{11}, M_{31})$, and $(M_{21}, M_{31})$ of the two-dimensional angular sensors and two-dimensional angular observation value are obtained.

In this case, each of the combinations is a two-dimensional angular observation value from the same first target, and hence it is determined that they are candidates for the real target, and the number of combinations for which it is determined that they are candidates for the real target becomes 3. Assuming that the predetermined value for determination of the real target is 2, the number of combinations for which it is determined that they are candidates for the real target exceeds the predetermined value, and hence it is determined that they are the real target. Likewise, when combinations of two two-dimensional angular sensors are selected from the combination $(M_{11}, M_{22}, M_{31})$, three combinations $(M_{11}, M_{22})$, $(M_{11}, M_{31})$, and $(M_{22}, M_{31})$ of the two-dimensional angular sensors and two-dimensional angular observation values are obtained. Here, even when it is incorrectly determined that $(M_{11}, M_{22})$ is a candidate for the real target on account of the dense environment, if erroneous determination does not simultaneously occur in $(M_{22}, M_{31})$, the number of combinations for which it is determined that they are candidates for the real target does not exceed the predetermined value for determination of the real target, and hence it is not determined that they are the real target.

As the determination system of the specific example 3, there is a determination system in which positions of at least three two-dimensional angular sensors and target direction vectors calculated based on two-dimensional angular observation values obtained from the at least three two-dimensional angular sensors are used to solve the multidimensional assignment problem (MAP), whereby it is determined that the determination is the real target. As the processing of the specific example 3, processing identical to the target tracking apparatus described in Document 2 (Krishna R. Pattipati, et al., "Passive Multisensor Data Association using a new Relaxation Algorithm", Multitarget-Multisensor Tracking Advanced Applications, ch. 7, Artech House, 1990) can be carried out.

The real-target determination selection section 103 analyzes the observation environment and, when the observation environment is an environment other than the dense environment, selects the first real-target determination section 101 as the real-target determination processing. Here, when the observation environment is the dense environment, the second real-target determination section 102 is selected as the real-target determination processing. The dense environment mentioned herein implies a case where the number m of targets in the predetermined space is greater than a threshold determined in advance. Accordingly, to say nothing of the case where many targets exist in the entire space and, even when the number of targets is small, the case where the number of targets in a predetermined space is large is the dense environment.

Figure 2A:
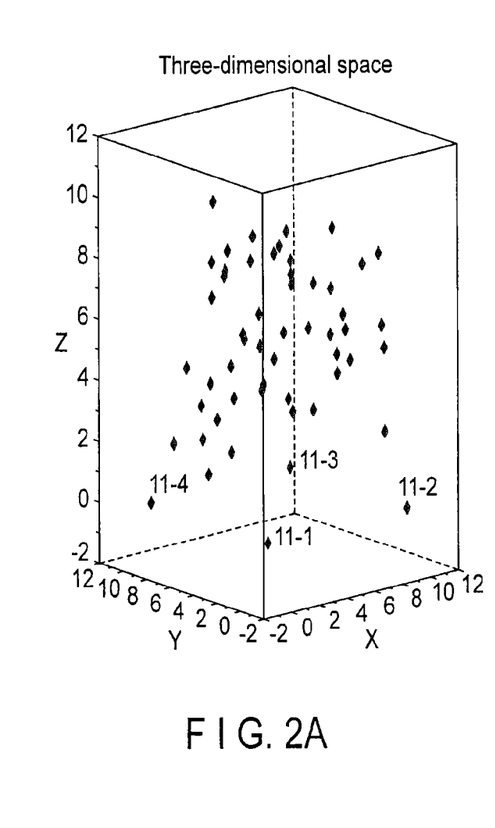
FIGS. 2A, 2B, 2C and 2D are views showing the first example of each dense environment.
Figure 2B:
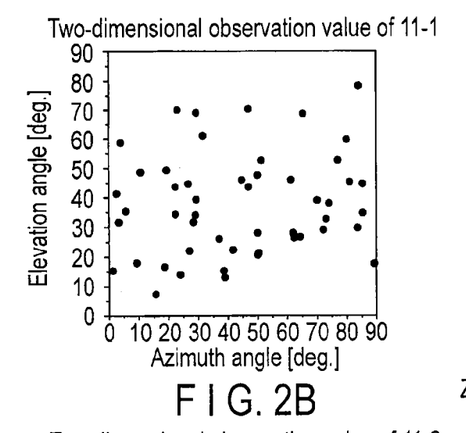
Figure 2C:
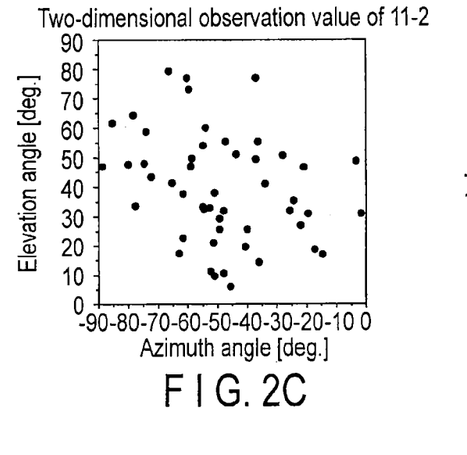
Figure 2D:
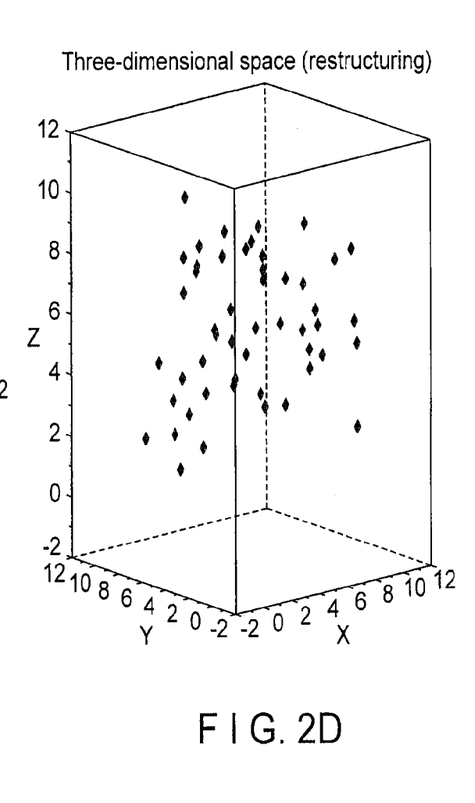

FIGS. 2A to 2D show a three-dimensional restructuring example in the dense environment in which many targets exist over the entire three-dimensional space. It is assumed that under the circumstances where many targets exist in the three-dimensional space shown in FIG. 2A, four two-dimensional angular sensors 11-1 to 11-4 are located at known positions. FIG. 2B shows the two-dimensional angular observation values obtained when two two-dimensional angular sensors 11-1 and 11-2 are selected from the four sensors, and when the three-dimensional space is viewed by the two-dimensional angular sensor 11-1. Similarly, FIG. 2C shows the two-dimensional angular observation values obtained when the three-dimensional space is viewed by the other two-dimensional angular sensor 11-2. To reproduce the target positions of FIG. 2A in the three-dimensional space shown in FIG. 2D, a reference vector is determined from the positions of the two two-dimensional angular sensors 11-1 and 11-2, and two target direction vectors are determined for each target from the signals output from the sensors 11-1 and 11-2. After that, using the determination system of the above-mentioned specific examples 1-3, target determination is sequentially performed for the respective targets.

Figure 3A:
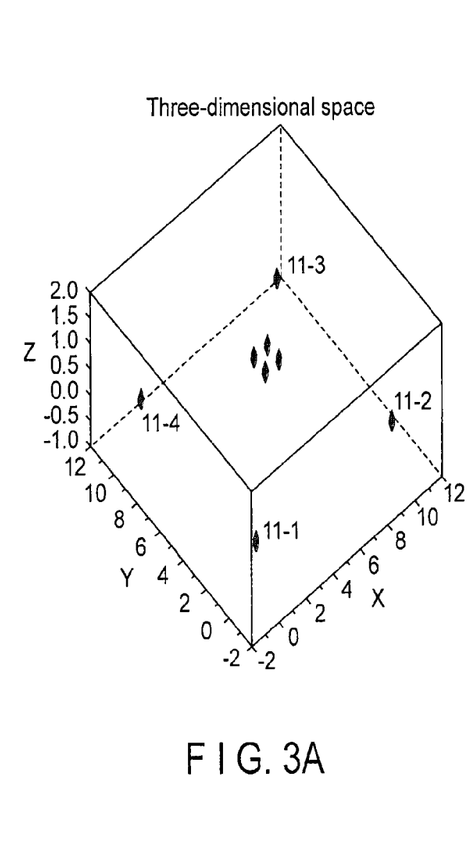
FIGS. 3A, 3B, 3C and 3D are views showing the second example of each dense environment.
Figure 3B:
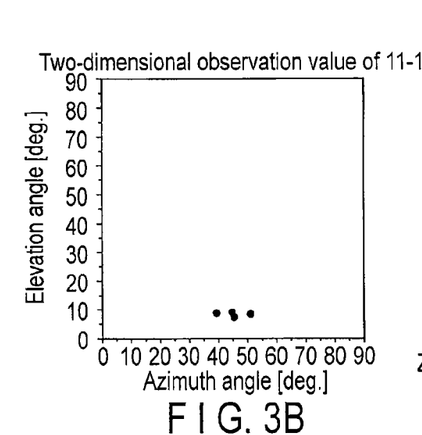
Figure 3C:
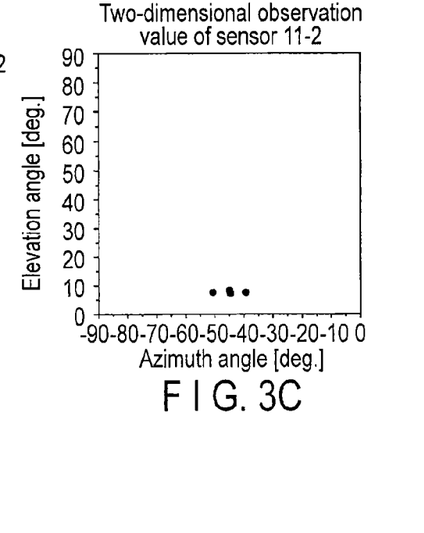
Figure 3D:
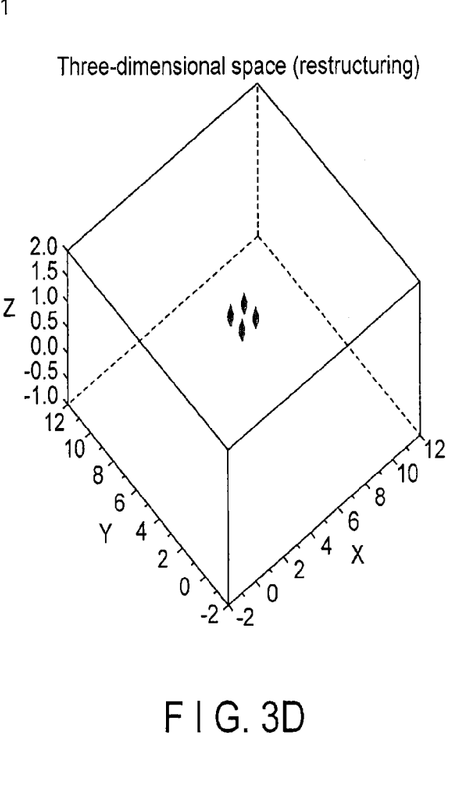

FIGS. 3A to 3D show a three-dimensional restructuring example assumed when a plurality of targets concentrate in a narrow region of a three-dimensional space, although the number of targets in the entire three-dimensional space is not so large. It is assumed that under the circumstances where a small number of targets exist in the three-dimensional space shown in FIG. 3A, four two-dimensional angular sensors 11-1 to 11-4 are located at known positions. FIG. 3B shows the two-dimensional angular observation values obtained when two two-dimensional angular sensors 11-1 and 11-2 are selected from the four sensors, and when the three-dimensional space is viewed by the two-dimensional angular sensor 11-1. Similarly, FIG. 3C shows the two-dimensional angular observation values obtained when the three-dimensional space is viewed by the other two-dimensional angular sensor 11-2. To reproduce the target positions of FIG. 3A in the three-dimensional space shown in FIG. 3D, a reference vector is determined from the positions of the two two-dimensional angular sensors 11-1 and 11-2, and two target direction vectors are determined for each target from the signals output from the sensors 11-1 and 11-2. After that, using the determination system of the above-mentioned specific examples 1-3, target determination is sequentially performed for the respective targets.

The three-dimensional track generation section 104 calculates distance information on the basis of a combination of two-dimensional tracks for which it is determined by the first real-target determination section 101 that the tracks are for the real target or on the basis of a combination of two-dimensional angular observation values for which it is determined by the second real-target determination section 102 that the angular observation values are for the real target, and generates a three-dimensional track to which the calculated distance information is added. According to the configuration of the three-dimensional track generation section 104, it is possible to carry out processing identical to the target tracking apparatus described in Document 3 (Masayoshi Ito, Shingo Tsujimichi, Yoshio Kosuge, "Tracking a 3-Dimensional Moving Target with Distributed Passive Sensors using Extended Kalman Filter", Transactions B, Institute of Electronics, Information and Communication Engineers, vol. J82-B, no. 5, pp. 1063-1072, May 1999), and Document 4 (S. S. Blackman, "Association and fusion of multiple sensor data," Multitarget-Multisensor Tracking Advanced Applications, ch 6, Artech House, 1990).

The three-dimensional track maintenance section 105 described above inputs a two-dimensional angular observation value for each target from each of the two-dimensional angular sensors 11-1 to 11-n, and maintains a three-dimensional track by using a three-dimensional track for each target generated by the three-dimensional track generation section 104 as an initial value. Here, the three-dimensional track maintenance section 105 calculates a two-dimensional predicted value on the basis of the maintained three-dimensional track, and determines whether or not there is data association between the two-dimensional predicted value and input two-dimensional angular observation value. Further, when it is determined that there is data association between them, the three-dimensional track is updated by using the two-dimensional angular observation value, thereby maintaining the three-dimensional track for each target. According to the configuration of the three-dimensional track maintenance section 105, it is possible to carry out processing identical to the target tracking apparatus described in Document 3.

Figure 4A:
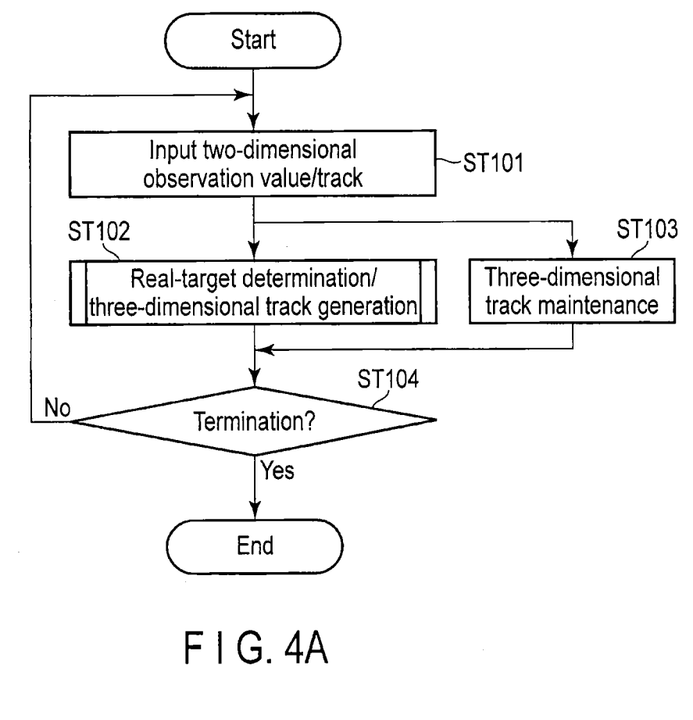
FIG. 4A is a flowchart showing a flow of processing of a target tracking apparatus used in the system shown in FIG. 1.
Figure 4B:
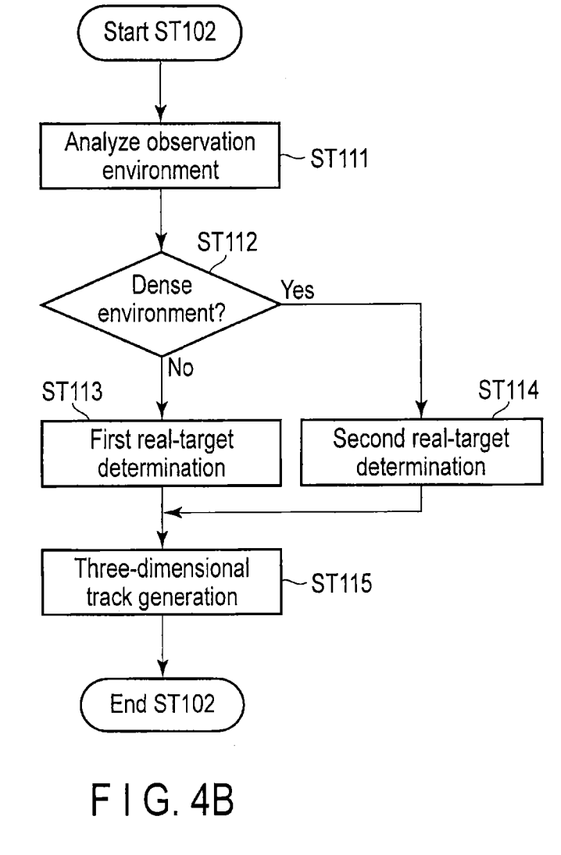
FIG. 4B is a flowchart showing a flow of detailed processing of step ST102 shown in FIG. 4A.

Subsequently, a flow of the processing of the target tracking apparatus 13 of the first embodiment will be described below with reference to FIG. 4A and FIG. 4B. Here, FIG. 4A is a flowchart showing the flow of the overall processing of the target tracking apparatus 13, and FIG. 4B is a flowchart showing the flow of the processing in the real-target determination/three-dimensional track generation step shown in FIG. 4A.

First, a two-dimensional angular observation value for each target obtained by each of the two-dimensional angular sensors 11-1 to 11-n, and two-dimensional track for each target obtained by each of the angular tracking devices 12-1 to 12-n are input (step ST101), and the real-target determination is carried out by using the input information items, thereby generating a three-dimensional track from the information on the real-target determination (step ST102). At the same time, the three-dimensional track already obtained by the three-dimensional track maintenance section 105 is maintained (step ST103). After this, the processing of steps ST101 to ST103 described above are repeated until an instruction to terminate the processing is issued (step ST104).

Subsequently, the real-target determination/three-dimensional track generation processing (step ST102) described above is executed by the first real-target determination section 101, second real-target determination section 102, real-target determination selection section 103, and three-dimensional track generation section 104 according to the procedure shown in FIG. 4B. First, the observation environment is analyzed by the real-target determination selection section 103 (step ST111), and it is determined whether or not the result of the analysis is the dense environment (step ST112). When the observation environment is an environment other than the dense environment, determination processing (the real target is determined from combinations of the two-dimensional tracks) is carried out by the first real-target determination section 101 (step ST113) and, when the observation environment is the dense environment, determination processing (the real target is determined from combinations of the two-dimensional angular observation values) is carried out by the second real-target determination section 102 (step ST114). When the processing of step ST113 or step ST114 is completed, distance information is added to the real-target determination result by the three-dimensional track generation section 104, thereby generating a three-dimensional track (step ST115), and the series of processing items is terminated.

Figure 5:
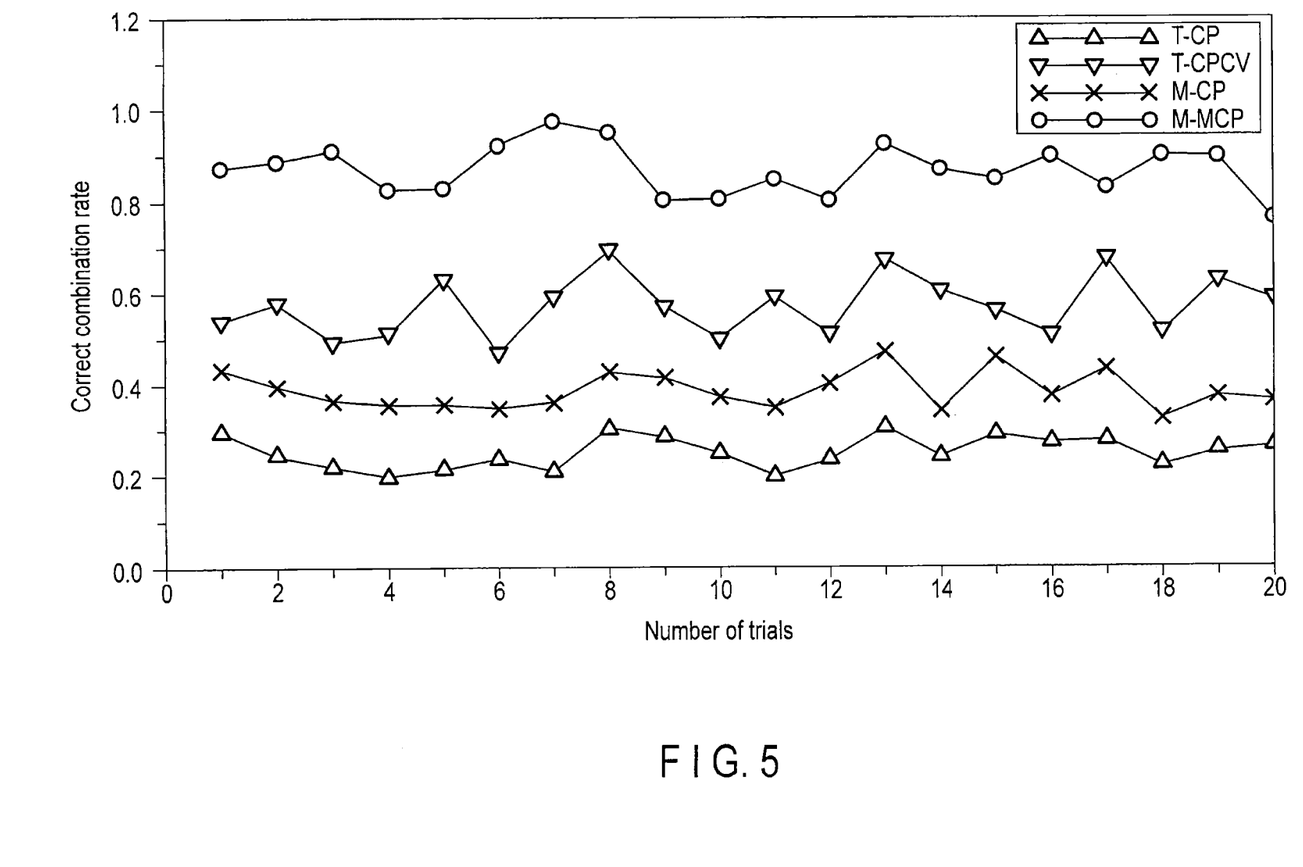
FIG. 5 is views showing an example of a simulation result of performance to determine the real target.

The simulation results of the real-target determination performance of the specific example 1 and specific example 2 of the first real-target determination section 101, and the specific example 1 and specific example 2 of the second real-target determination section 102 are shown in FIG. 5. In FIG. 5, abbreviations of the specific example 1 and specific example 2 of the first real-target determination section 101 to which the two-dimensional track is input are T-CP, and T-CPCV, respectively, and abbreviations of the specific example 1 and specific example 2 of the second real-target determination section 102 to which the two-dimensional angular observation value is input are M-CP, and M-MCP, respectively. It should be noted that in the simulation shown in FIG. 5, the multi-target/dense environment shown in FIG. 2A is used as the input environment and, as the indicator of the real-target determination performance, a ratio of combinations of correct tracks (or observation values) of combinations of tracks (or observation values) for which it is determined that each of them is the real target is shown as the correct combination rate.

From FIG. 5, it can be seen that the correct combination rate of M-CP in which the two-dimensional angular observation value is used as the input is higher when T-CP (corresponding to the specific example 1 of the first real-target determination section 101), and M-CP (corresponding to the specific example 1 of the second real-target determination section 102) are compared with each other. Likewise, it can be seen that the correct combination rate of M-MCP in which the two-dimensional angular observation value is used as the input is higher when T-CPCV (corresponding to the specific example 2 of the first real-target determination section 101), and M-MCP (corresponding to the specific example 2 of the second real-target determination section 102) are compared with each other.

In the first real-target determination section 101 described above, processing identical to the target tracking apparatus described in the above-mentioned publication or Document 1 is carried out. That is, in the target tracking apparatus described in the documents, with an increase in the number m of targets in a predetermined space to be input to the angular tracking device, two-dimensional tracks based on incorrect data association become liable to occur, and the performance for determining which combination of two-dimensional tracks is for the real target from combinations of two-dimensional tracks output from the angular tracking device has been deteriorated.

Conversely, in the target tracking apparatus 13 of this embodiment, when the number m of targets in the predetermined space to be input to the angular tracking device increases to turn the observation environment into the dense environment, a two-dimensional angular observation value which has not been affected by incorrect data association (which has not been subjected to data association by the angular tracking device) is used in place of a two-dimensional track which has been affected by incorrect data association to determine which combination of two-dimensional angular observation values is for the real target from combinations of two-dimensional angular observation values obtained from a plurality of two-dimensional angular sensors.

Accordingly, in the target tracking system configured as described above, it is determined whether or not the observation environment is the dense environment by analysis of the observation environment, when the observation environment is an environment other than the dense environment, determination of the real target is carried out by utilizing the two-dimensional tracks, and when the observation environment is the dense environment, determination of the real target is carried out by utilizing the two-dimensional angular observation values which has not been affected by incorrect data association in the angular tracking device, it is therefore possible to enhance the real-target determination performance.

It should be noted that although in the above description, the target tracking apparatus 13 provided with the three-dimensional track maintenance section 105 has been exemplified, it is possible to configure the target tracking apparatus 13 in such a manner that that the three-dimensional track maintenance section 105 is omitted, and a three-dimensional track for each target generated by the three-dimensional track generation section 104 is output.

Second Embodiment

Figure 6:
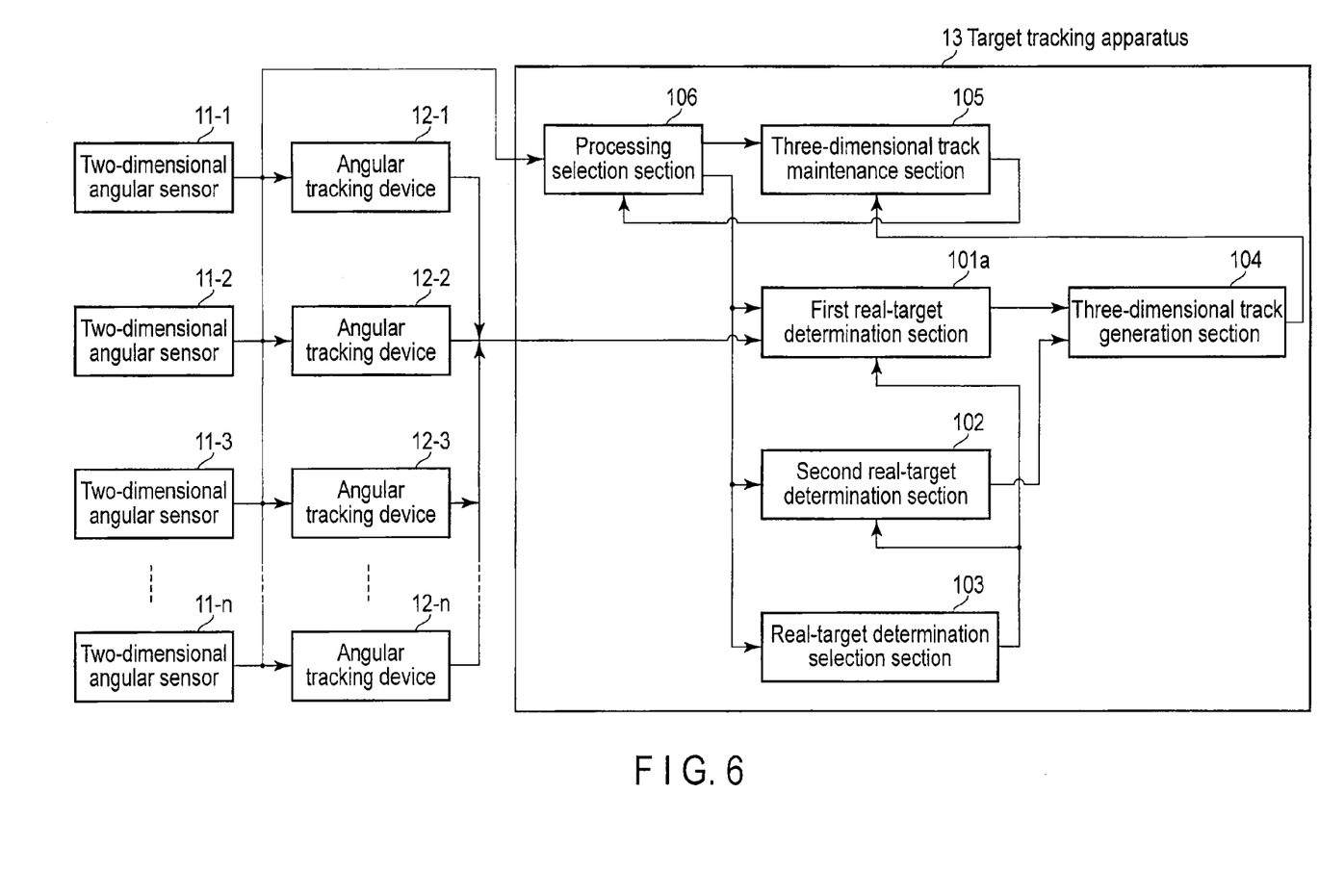
FIG. 6 is a block diagram showing the configuration of a target tracking system according to a second embodiment.

FIG. 6 is a block diagram showing the configuration of a target tracking system according to a second embodiment. This target tracking system is provided with, like the first embodiment, n (n is an integer of 2 or 3 or greater) two-dimensional angular sensors 11-1 to 11-$n$ each of which is configured to observe a two-dimensional angle of a target, n angular tracking devices 12-1 to 12-$n$ each of which is configured to carry out angular tracking for each target by calculating a two-dimensional track for each target from a two-dimensional angular observation value for each target obtained from each of the two-dimensional angular sensors 11-1 to 11-$n$, and a target tracking apparatus 13 configured to track each target by generating a three-dimensional track for each target from a two-dimensional angular observation value for each target obtained from each of the two-dimensional angular sensors 11-1 to 11-$n$, and two-dimensional track for each target obtained from each of the angular tracking devices 12-1 to 12-$n$, and maintaining the generated three-dimensional tracks.

In the target tracking system configured as described above, the target tracking apparatus 13 of this embodiment is configured to input the two-dimensional angular observation value obtained from each of the two-dimensional angular sensors 11-1 to 11-$n$, and two-dimensional track for each target obtained from each of the angular tracking devices 12-1 to 12-$n$, calculate distance information, and add the calculated distance information to the two-dimensional track or the two-dimensional angular observation value to thereby generate a three-dimensional track and maintain the generated three-dimensional track. More specifically, the target tracking apparatus 13 is constituted of a first real-target determination section 101$a$, second real-target determination section 102, real-target determination selection section 103, three-dimensional track generation section 104, three-dimensional track maintenance section 105, and processing selection section 106.

The processing selection section 106 described above inputs a two-dimensional angular observation value obtained from each of the two-dimensional angular sensors 11-1 to 11-$n$, and two-dimensional predicted value obtained from the three-dimensional track maintenance section 105, acquires data association between the two-dimensional angular observation value and two-dimensional predicted value, and selectively executes maintenance/generation of the three-dimensional track according to presence/absence of the data association.

The above-mentioned second real-target determination section 102, real-target determination selection section 103, three-dimensional track generation section 104, and three-dimensional track maintenance section 105 are identical to the first embodiment except that the two-dimensional angular observation value selected by the processing selection section 106 is input, and hence a description of them will be omitted.

Although the first real-target determination section 101$a$ described above is, as in the first embodiment, configured to carry out processing identical to the target tracking apparatus described in the above-mentioned publication and Document 1, the section 101$a$ differs from the first embodiment in that the section 101$a$ extracts a two-dimensional track corresponding to a two-dimensional angular observation value for which it is determined by the processing selection section 106 that there is no data association of the two-dimensional angular observation value with the two-dimensional predicted value, and carries out processing for the extracted two-dimensional track.

Figure 7:
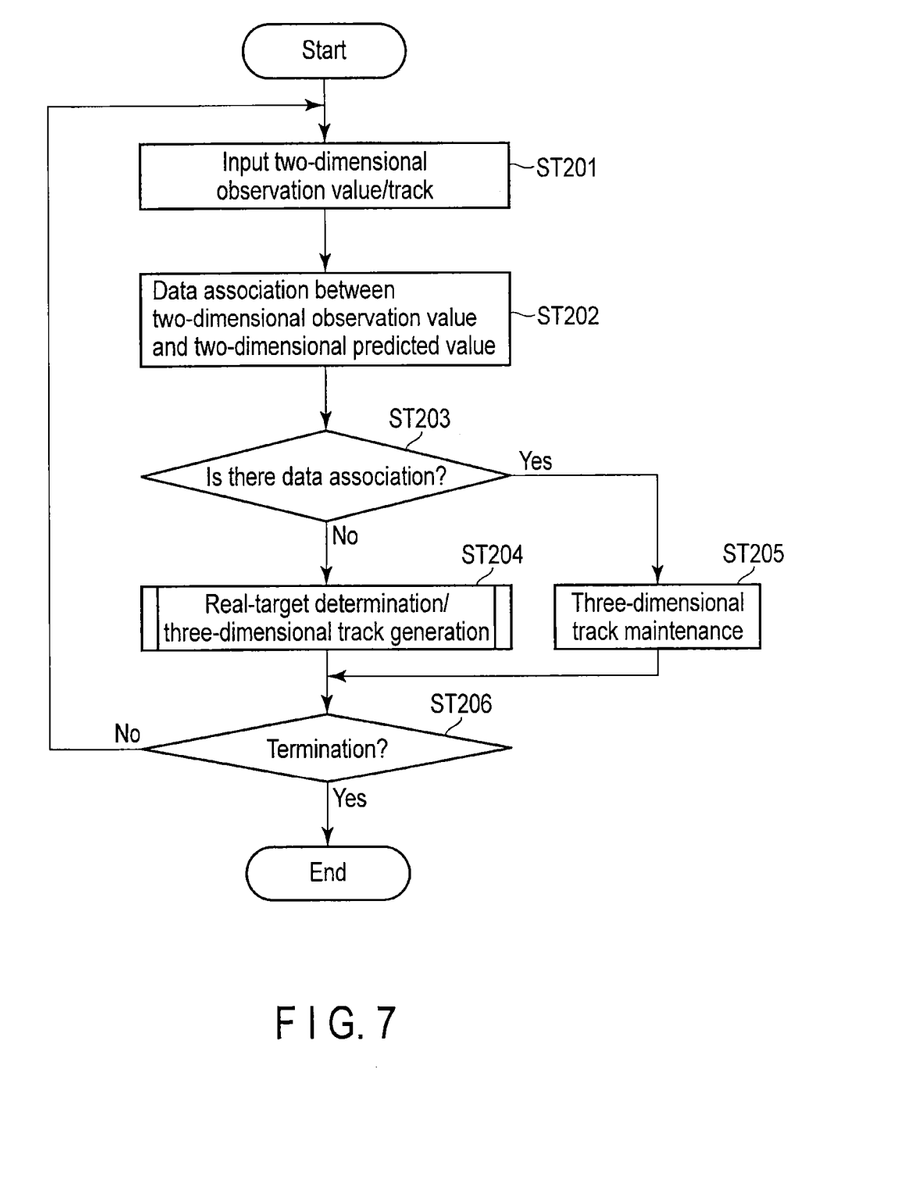
FIG. 7 is a flowchart showing a flow of processing of a target tracking apparatus used in the system shown in FIG. 6.

Subsequently, a flow of the processing of the target tracking apparatus 13 of the second embodiment will be described below with reference to FIG. 7. Here, FIG. 7 is a flowchart showing the flow of the overall processing of the target tracking apparatus 13.

First, when a two-dimensional angular observation value for each target obtained by each of the two-dimensional angular sensors 11-1 to 11-$n$, and two-dimensional track for each target obtained by each of the angular tracking devices 12-1 to 12-$n$ are input (step ST201), data association between the two-dimensional angular observation value and two-dimensional predicted value is taken by the processing selection section 106 (step ST202), and it is determined whether or not there is data association between them (step ST203). When it is determined that there is no data association, generation processing of a three-dimensional track based on the first and second real-target determination processing results is selectively executed (step ST204) and, when it is determined that there is data association, maintenance processing of the three-dimensional track is executed (step ST205). After this, the processing of steps ST201 to ST205 described above are repeated until an instruction to terminate the processing is issued (step ST206).

Here, step ST204 is processing identical to step ST102 of the first embodiment as shown FIG. 4B, and step ST205 is processing identical to step ST103 of the first embodiment as shown FIG. 4B.

In the target tracking system configured as described above, as in the first embodiment, it is determined whether or not the observation environment is the dense environment on the basis of analysis of the observation environment, when the observation environment is an environment other than the dense environment, determination of the real target is carried out by utilizing the two-dimensional tracks and, when the observation environment is the dense environment, determination of the real target is carried out by using a two-dimensional angular observation values which has not been affected by incorrect data association in the angular tracking device, it is therefore possible to enhance the real-target determination performance. Further, the real-target determination/three-dimensional track generation processing is carried out only when it is determined that there is no data association between the two-dimensional angular observation value and two-dimensional predicted value in the data association result, and hence it becomes possible to reduce the two-dimensional angular observation value or the two-dimensional track which becomes an object of the real-target determination processing, and realize size reduction in the device scale of the target tracking apparatus, and shortening of the processing time.

Third Embodiment

Figure 8:
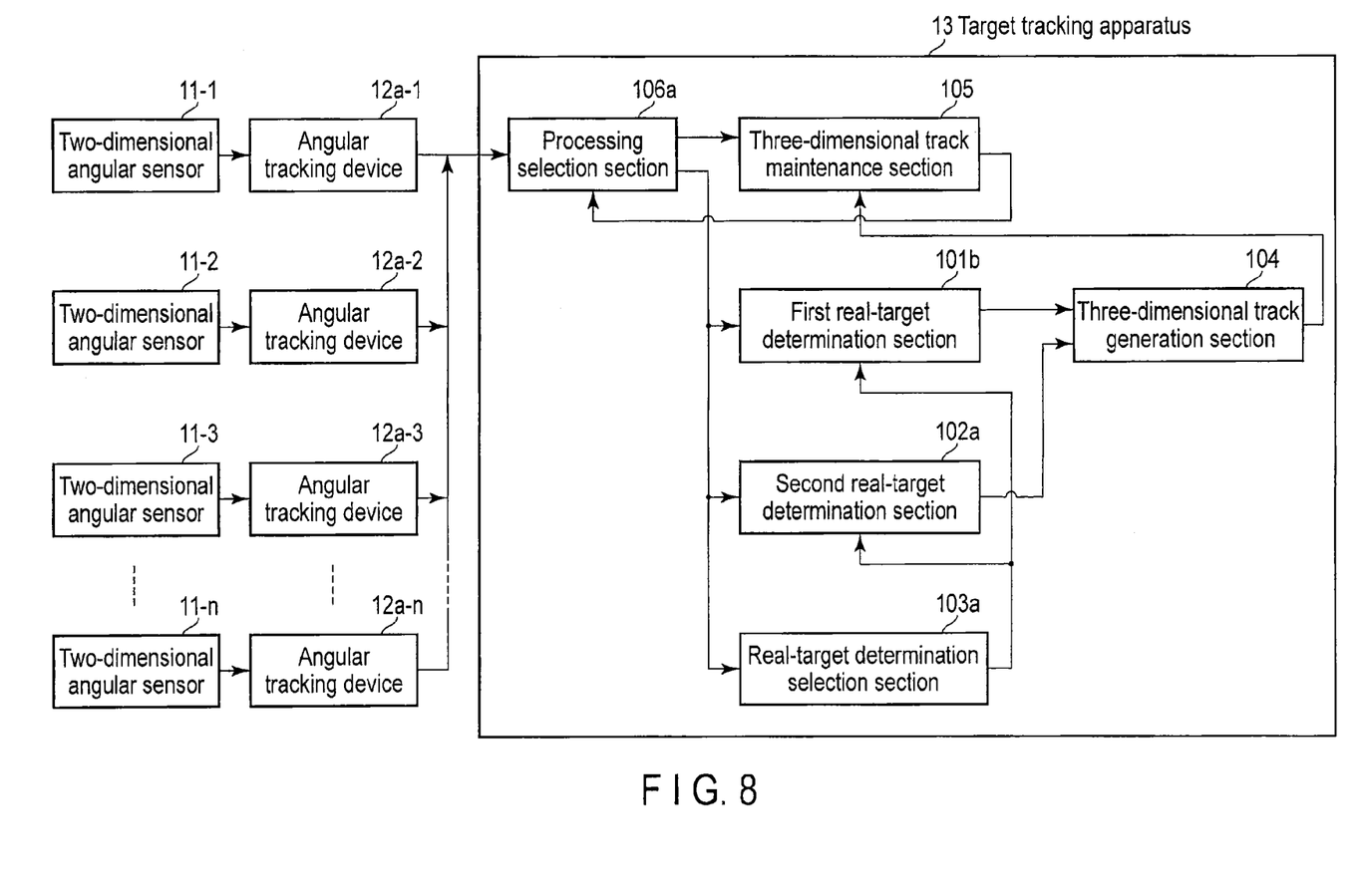
FIG. 8 is a block diagram showing the configuration of a target tracking system according to a third embodiment.

FIG. 8 is a block diagram showing the configuration of a target tracking system according to a third embodiment. This target tracking system is provided with n (n is an integer of 2 or greater) two-dimensional angular sensors 11-1 to 11-$n$ each of which is configured to observe a two-dimensional angle of a target. A two-dimensional angular observation value of each target obtained by each of the two-dimensional angular sensors 11-1 to 11-$n$ is sent to corresponding one of n angular tracking devices 12$a$-1 to 12$a$-$n$.

The n angular tracking devices 12$a$-1 to 12$a$-$n$ are the characteristic part of this embodiment, and each of the devices 12$a$-1 to 12$a$-$n$ is provided with a pairing function of calculating a two-dimensional track from a two-dimensional angular observation value obtained from each of the two-dimensional angular sensors 11-1 to 11-$n$, pairing the observation value and two-dimensional track with each other, and outputting the pair to the target tracking apparatus 13 as angular tracking information.

Although the target tracking apparatus 13 is basically identical to the second embodiment, the two-dimensional angular observation value and two-dimensional track are paired as the angular tracking information, and hence each of a first real-target determination section 101$b$, second real-target determination section 102$a$, real-target determination selection section 103$a$, and processing selection section 106$a$ executes own processing (processing identical to the processing of each of the first real-target determination section 101$a$, second real-target determination section 102, real-target determination selection section 103, and processing selection section 106 of the second embodiment) by using the paired angular tracking information.

In the target tracking system configured as described above, as in the first embodiment, it is determined whether or not the observation environment is the dense environment on the basis of analysis of the observation environment, when the observation environment is an environment other than the dense environment, determination of the real target is carried out by utilizing the two-dimensional tracks and, when the observation environment is the dense environment, determination of the real target is carried out by using a two-dimensional angular observation values which has not been affected by incorrect data association in the angular tracking device, it is therefore possible to enhance the real-target determination performance.

Further, as in the second embodiment, the real-target determination/three-dimensional track generation processing is carried out only when it is determined that there is no data association between the two-dimensional angular observation value and two-dimensional predicted value in the data association result, and hence it becomes possible to reduce the two-dimensional angular observation value or the two-dimensional track which becomes an object the real-target determination processing, and realize size reduction in the device scale of the target tracking apparatus, and shortening of the processing time.

Furthermore, the pairing processing of the two-dimensional track and two-dimensional angular observation value is carried out in the stage of the angular tracking, and hence it becomes unnecessary to carry out extraction of a two-dimensional track corresponding to the two-dimensional angular observation value for which it is determined that there is no data association of the observation value with the two-dimensional predicted value, the extraction having been carried out by the first real-target determination section 101$a$ in the second embodiment, and it is possible to realize further size reduction in the device scale of the target tracking apparatus, and shortening of the processing time.

It should be noted that although in the above-mentioned third embodiment, the case where the pairing processing is applied to the second embodiment has been described, it is also possible to apply the pairing processing to the first embodiment.

Further, in the first to third embodiments, it is possible to utilize an image sensor, sonar device, passive radar device or the like as each of the n N-dimensional (N is 1 or 2) angular sensors 11-1 to 11-$n$ configured to observe an angle of a target, and it is also possible to integrate information items obtained by these sensors and apply the integrated information to the target tracking apparatus configured to carry out generation/maintenance of an (N+1)-dimensional track of the target.

The processing of each of the above-mentioned embodiments can be executed by a computer by converting the sensor output into data, and converting the processing of the overall system or the processing of the target tracking apparatus into a program.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A target tracking apparatus configured to track each target on the basis of an N-dimensional (N is 1 or 2) angular observation value for each target detected by each of n (n is an integer equal to or greater than 2) N-dimensional angular sensors, and an N-dimensional track for each target obtained by subjecting each of the N-dimensional angular observation values to angular tracking comprising:
   a first determination device configured to determine which combination of N-dimensional tracks is for the real target from combinations of N-dimensional tracks for the target;
   a second determination device configured to determine which combination of N-dimensional angular observation values is for the real target from combinations of N-dimensional angular observation values for the target;
   a determination selection device configured to analyze an observation environment for the target, select the determination of the first determination device when the observation environment is an environment other than a dense environment, and select the determination of the second determination device when the observation environment is a dense environment; and
   a track generation device configured to calculate distance information on the basis of a combination of N-dimensional tracks for which it is determined by the first determination device that the tracks are for the real target or on the basis of a combination of N-dimensional angular observation values for which it is determined by the second determination device that the angular observation values are for the real target, and add the calculated distance information to the N-dimensional track or the N-dimensional angular observation value for each target to thereby generate an (N+1)-dimensional track for each target.

2. The target tracking apparatus of claim 1, further comprising a maintenance device configured to determine whether or not there is data association between the N-dimensional angular observation value detected by each of the n N-dimensional angular sensors, and the (N+1)-dimensional track generated by the (N+1)-dimensional track generation device, and update the (N+1)-dimensional track with the associated N-dimensional angular observation value for maintaining the (N+1)-dimensional track.

3. The target tracking apparatus of claim 2, further comprising a processing selection device configured to determine whether or not there is data association between the N-dimensional angular observation value detected by the N-dimensional angular sensor, and the (N+1)-dimensional track from the maintenance device, output, when it is determined that there is data association between the angular observation value, and the track, the N-dimensional angular observation value to the maintenance device, and output, when it is determined that there is no data association between the angular observation value and the track, the N-dimensional track corresponding to the N-dimensional angular observation value to the first determination device, and the N-dimensional angular observation value to the second determination device, and the determination selection device.

4. The target tracking apparatus of claim 1, wherein the first determination device determines, when three vectors including one reference vector calculated based on positions of two N-dimensional angular sensors of the n angular sensors, and two target direction vectors calculated based on an N-dimensional track obtained by carrying out angular tracking for each of the N-dimensional angular sensors exist in the common plane within a predetermined error range, that they are the real target.

5. The target tracking apparatus of claim 1, wherein the first determination device determines, when three vectors including one reference vector calculated based on positions of two N-dimensional angular sensors of the n angular sensors, and two target direction vectors calculated based on an N-dimensional track obtained by carrying out angular tracking for each of the N-dimensional angular sensors exist in the common plane within a predetermined error range, and velocity vectors in the (N+1)-dimensional space calculated on the basis of angular velocities included in the N-dimensional track become identical to each other within a predetermined error range, that the determination is the real target.

6. The target tracking apparatus of claim 1, wherein the first determination device determines, when three vectors including one reference vector calculated based on positions of the two selected N-dimensional angular sensors of the n angular sensors, and two target direction vectors calculated based on an N-dimensional track obtained by carrying out angular tracking for each of the two selected N-dimensional angular sensors exist in the common plane within a predetermined error range, that they are candidates for the real target, and determines, when the number of combinations of N-dimensional angular sensors for which it is determined that they are candidates for the real target exceeds a predetermined value, that they are the real target.

7. The target tracking apparatus of claim 1, wherein the second determination device determines, when three vectors including one reference vector calculated based on positions of two N-dimensional angular sensors of the n angular sensors, and two target direction vectors calculated based on an N-dimensional angular observation value detected by each of the N-dimensional angular sensors exist in the common plane within a predetermined error range, that they are the real target.

8. The target tracking apparatus of claim 1, wherein the second determination device determines, when three vectors including one reference vector calculated based on positions of the two selected N-dimensional angular sensors of the n angular sensors, and two target direction vectors calculated based on an N-dimensional angular observation value detected by each of the two selected N-dimensional angular sensors exist in the common plane within a predetermined error range, that they are candidates for the real target, and determines, when the number of combinations of N-dimensional angular sensors for which it is determined that they are candidates for the real target exceeds a predetermined value, that they are the real target.

9. The target tracking apparatus of claim 1, wherein the second determination device uses positions of at least three N-dimensional angular sensors of the n angular sensors, and target direction vectors calculated from N-dimensional angular observation values detected by the at least three N-dimensional angular sensors to solve a multidimensional assignment problem, thereby carrying out determination of the real target.

10. A target tracking system comprising:
n (n is an integer equal to or greater than 2) N-dimensional (N is 1 or 2) angular sensors each of which is configured to observe a target, and obtain an N-dimensional angular observation value;
n angular tracking devices provided in one-to-one correspondence with the n N-dimensional angular sensors, and each configured to calculate an N-dimensional track for each target by carrying out angular tracking on the basis of the N-dimensional angular observation value for each target, the angular observation value being detected by the sensor; and
a target tracking apparatus configured to generate an (N+1)-dimensional track of a target on the basis of the N-dimensional angular observation value for each target, the angular observation value being detected by each of the n N-dimensional angular sensors, and the N-dimensional track for each target, the track being obtained from the angular tracking device, wherein
the target tracking apparatus comprises:
a first determination device configured to determine which combination of N-dimensional tracks is for the real target from combinations of N-dimensional tracks for the target;
a second determination device configured to determine which combination of N-dimensional angular observation values is for the real target from combinations of N-dimensional angular observation values for the target;
a determination selection device configured to analyze an observation environment for the target, select the first determination device when the observation environment is an environment other than a dense environment, and select the second determination device when the observation environment is a dense environment; and
a track generation device configured to calculate distance information on the basis of a combination of N-dimensional tracks for which it is determined by the first determination device that the tracks are for the real target or on the basis of a combination of N-dimensional angular observation values for which it is determined by the second determination device that the angular observation values are for the real target, and add the calculated distance information to the N-dimensional track or the N-dimensional angular observation value for each target to thereby generate an (N+1)-dimensional track for each target.

11. The target tracking system of claim 10, wherein the target tracking apparatus further comprises a maintenance device configured to determine whether or not there is data association between the N-dimensional angular observation value detected by each of the n N-dimensional angular sensors, and the (N+1)-dimensional track generated by the track generation device, and update the (N+1)-dimensional track with the associated N-dimensional angular observation value for maintaining the (N+1)-dimensional track.

12. The target tracking system of claim 11, wherein the target tracking apparatus further comprises a processing selection device configured to determine whether or not there is data association between the N-dimensional angular observation value detected by the N-dimensional angular sensor, and the (N+1)-dimensional track from the maintenance device, output, when it is determined that there is data association between the angular observation value, and the track, the N-dimensional angular observation value to the maintenance device, and output, when it is determined that there is no data association between the angular observation value, and the track, the N-dimensional track corresponding to the N-dimensional angular observation value to the first determination device, and the N-dimensional angular observation value to the second determination device, and the determination selection device.

13. The target tracking system of claim 10, wherein the target tracking apparatus further comprises a pairing device configured to calculate an N-dimensional track from a two-dimensional angular observation value detected by the N-dimensional angular sensor, and pair the N-dimensional angular observation value and the N-dimensional track with each other to output the pair as angular tracking information.

* * * * *